United States Patent [19]

Freeland

[11] Patent Number: 5,000,527

[45] Date of Patent: Mar. 19, 1991

[54] MULTIPLE WAVEBAND OPTICAL ELEMENT

[75] Inventor: Colin Freeland, Herts, England

[73] Assignee: British Aerospace Public Limited Company, London, England

[21] Appl. No.: 446,549

[22] Filed: Dec. 7, 1989

[30] Foreign Application Priority Data

Dec. 8, 1988 [GB] United Kingdom ............... 8828652

[51] Int. Cl.$^5$ ............................ G02B 1/10; G02B 5/28
[52] U.S. Cl. .................................... 350/1.61; 350/1.1; 350/164; 342/22
[58] Field of Search ................ 350/1.6, 1.1, 164, 163, 350/165; 342/22, 53; 343/721, 725, 872, 909

[56] References Cited

U.S. PATENT DOCUMENTS

| 2,887,684 | 5/1958 | Dexter et al. | 343/909 |
| 3,165,749 | 1/1965 | Cushner | 342/53 |
| 3,310,807 | 3/1967 | Kofoid | 343/872 |
| 3,911,433 | 10/1975 | Redman | 342/53 |
| 4,797,683 | 1/1989 | Kosowsky et al. | 343/872 |

FOREIGN PATENT DOCUMENTS 1-080906  3/1989  Japan ................................ 350/1.6

Primary Examiner—Bruce Y. Arnold
Assistant Examiner—David R. Parsons
Attorney, Agent, or Firm—Nixon & Vanderhye

[57] ABSTRACT

A multiple-waveband, e.g., for the infra-red and millimetric RF wavebands, optical element such as a window includes a core element and respective separately made outer elements secured to the core and having thicknesses and dielectric constants adapted to give anti-reflection characteristics.

2 Claims, 1 Drawing Sheet

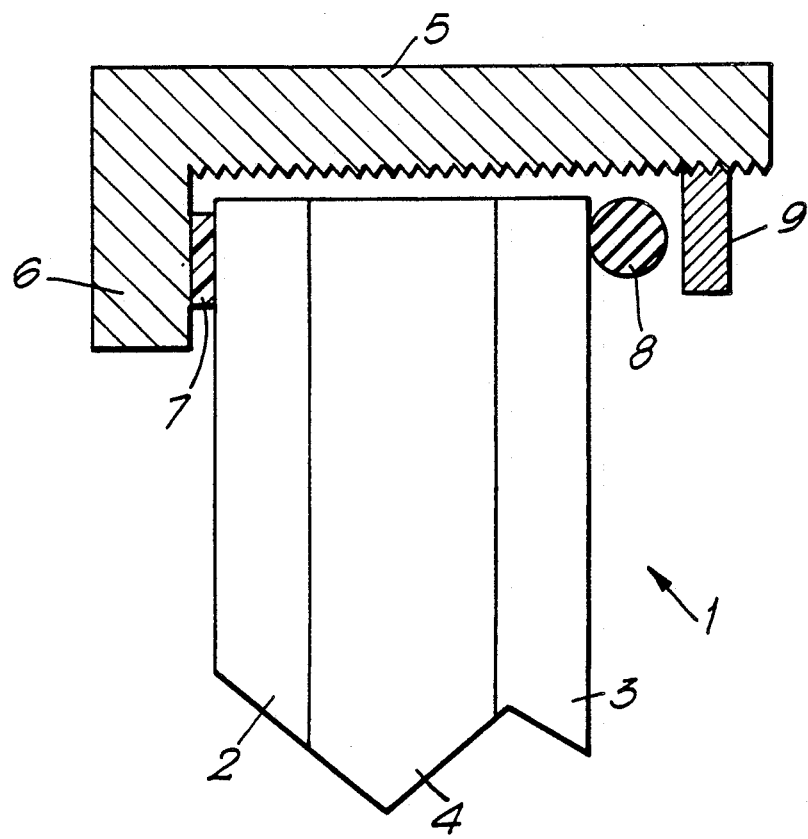

MULTIPLE WAVEBAND OPTICAL ELEMENT

BACKGROUND OF THE INVENTION

1. Field of this Invention

This invention relates to a multiple waveband optical element, specifically but not exclusively to a window for use in the infra-red and millimetric wavebands.

2. DISCUSSION OF PRIOR ART

Most infra-red window materials have low loss in the microwave (8–16 GHz) and millimetric (35 and 95 GHz) bands and can be used as a window provided the reflection can be kept to a minimum. The reflection is a minimum if the window is an integral number of half wavelengths thick. For frequencies up to 35 GHz the required tolerances on thickness are easily attainable. At 95 GHz however, the stricter tolerances required are very difficult to achieve.

In order to reduce the reflection from optical components it is known to provide them with anti-reflection coatings, which coatings may comprise several layers of chosen thicknesses and refractive indices. European patent application No. 2149138 discloses such a multi-layer anti-reflection coating intended to provide an anti-reflection effect within two separated waveband regions. A problem with such coatings, i.e., thin films of material deposited on the basic optical component by evaporation or a like technique, is that it is difficult or even impossible to achieve layer thicknesses of the order required to provide a truly worthwhile anti-reflection effect in the millimetre waveband.

SUMMARY OF THE INVENTION

One object of the present invention is to produce a window which is easier to construct and transmits infra-red and radiation in the high millimetric bands.

According to one aspect of the present invention there is provided a window for transmitting infra-red and radio frequencies comprising two skin IR transmissive layers and a core IR transmissive layer characterised in that the thicknesses of said layers are computed depending on the radio frequency required to be transmitted.

BRIEF DISCUSSION OF THE DRAWING

Reference will now be made, by way of example, to the accompanying drawing, the single FIGURE of which is a simplified diagram of a window according to the present invention.

DETAILED DISCUSSION OF PREFERRED EMBODIMENTS

The illustrated sandwich window 1 comprises three layers, namely two magnesium fluoride outer elements 2 and 3 and a central core 4. The outer elements 2 and 3 are not merely coatings formed on the surfaces of the core 4 but rather comprise respective separately made window elements. As discussed later each outer element might be a millimetre or more in thickness. The central core 4 may typically be of any IR transmissive material of the appropriate dielectric constant and by way of example, sapphire, silver chloride, zinc sulphide or calcium aluminate may be used in conjunction with magnesium fluoride. The window is held in a frame 5 having an inwardly projecting annular flange 6 against which the periphery of one side of the window is engaged with a flat nylon sealing washer 7 between the window and the flange. A rubber O-ring seal 8 is engaged against the periphery of the other side of the window and an annular clamp ring 9 having a screw-threaded outer surface is engaged with the threaded inner surface of frame 5 and screwed in to clamp the window in place and at the same time, maintain the three component layers 2, 3 and 4 of the window pressed together.

By using different thicknesses of the window components, transmission in both the 94 GHz frequency range and the IR range may be achieved.

Maximum transmission of the window is achieved when the reflection is kept to minimum. The minimisation of reflection results from cancellation of the reflections from the front and rear surfaces of the layers. At a given design angle the thicknesses of the layers are chosen to give cancellation of these reflections and hence zero reflection for the sandwich. Using a symmetrical sandwich (e.g. 1, 3, or 5 layers makes cancelling the reflections easier.

In a sandwich with relatively low dielectric constant layers each side of a central relatively high dielectric core layer, the reflection cancellation can be achieved in a number of ways. For example, the thicknesses of the skins are equal to an odd number of quarter wavelengths in the material and the core thickness equal to an integral number of half wavelengths. Alternatively, or in combination to the above, the skin and core are chosen such that the dielectric constant of the skin is equal to the square root of the core dielectric constant. An example of some typical profiles of the window are shown below.

| Skin | | Core | | GHz Transmission Peak Frequency |
|---|---|---|---|---|
| Material | Thickness | Material | Thickness | GHz |
| MgF$_2$ | 1.07 mm | Sapphire | 2.08 mm | 94 |
| MgF$_2$ | 1.07 mm | AgCl | 2.27 mm | 94 |
| MgF$_2$ | 1.43 mm | Calcium Aluminate | 1.88 mm | 94 |
| MgF$_2$ | 1.43 mm | ZnS | 2.20 mm | 94 |
| MgF$_2$ | 1.07 mm | Sapphire | 2.60 mm | 94 |
| MgF$_2$ | 1.07 mm | AgCl | 1.73 mm | 94 |
| MgF$_2$ | 1.43 mm | Calcium Aluminate | 2.35 mm | 94 |
| MgF$_2$ | 1.43 mm | ZnS | 2.75 mm | 94 |
| MgF$_2$ | 1.07 mm | Sapphire | 3.12 mm | 94 |
| MgF$_2$ | 1.07 mm | ZnS | 3.30 mm | 94 |

It will be appreciated that for different GHz transmission peaks the thicknesses of the components of the window may be computed and the materials chosen to meet the requirements.

Instead of clamping the layers together as shown in the drawing, they may be bonded together using polythene as bonding layers. Thus, 25 micron thick layers of polythene may be placed between the window layers and the sandwich thereby formed pressed together in an oven. The polythene forms a strong bond which is infra-red transparent while not greatly affecting the RF transmissivity.

I claim:

1. A window for transmitting infra-red and radio frequency radiation, said radio frequency radiation having a wavelength, said window comprising:
   a core IR transmissive layer having a relatively high dielectric constant; and
   two skin IR transmissive layers having relatively low dielectric constant, said core IR transmissive layer having a thickness equal to an integral number of half wavelengths of said radio frequency radiation and at least one of said skin IR transmissive layers having a thickness equal to an odd number of quarter wavelengths of said radio frequency radiation.

2. A window for transmitting infra-red and radio frequency radiation, said window comprising:

a core IR transmissive layer having a relatively high dielectric constant; and two skin IR transmissive layers, each of said skin IR transmissive layers having a relatively low dielectric constant, where the square root of said core IR transmissive layer dielectric constant is substantially equal to the dielectric constant of one of said skin IR transmissive layers.

* * * * *